United States Patent [19]

Kolosov et al.

[11] 4,171,679

[45] Oct. 23, 1979

[54] METHOD AND APPARATUS FOR IMPREGNATION OF CERMET ELECTRODES OF AN ALKALINE STORAGE BATTERY

[76] Inventors: Ivan A. Kolosov, ulitsa Astrakhanskaya, 118, kv. 54; Nikolai V. Kuryshev, ulitsa Ordzhonikidze, 6, kv. 11; Jury E. Ivanyatov, ulitsa M. Zatonskaya, 21; Vera N. Kalininskaya, ulitsa Sakko-Vantsetti, 23, kv. 23, all of Saratov; Igor K. Yartsev, Grazhdansky prospekt, 94, korpus 2, kv. 8, Leningrad; Arkady K. Pugachev, Pravy Bereg Nevy, 222, korpus 3, kv. 85, Leningrad; Svetlana M. Savina, Poljustrovsky prospekt, 5, kv. 179, Leningrad, all of U.S.S.R.

[21] Appl. No.: 778,951

[22] Filed: Mar. 18, 1977

[51] Int. Cl.$^2$ ............................................. B05C 3/132
[52] U.S. Cl. ...................................... 118/425; 68/198; 242/67.3 R
[58] Field of Search ............... 118/50, 428, 425, 50 D; 242/67.3 R; 68/198, 199; 354/341, 342

[56] References Cited

U.S. PATENT DOCUMENTS

| | | | |
|---|---|---|---|
| 866,321 | 9/1907 | Barnes | 354/341 X |
| 1,315,763 | 9/1919 | Dickey | 118/50 |
| 1,644,462 | 10/1927 | Bachofen | 68/199 |
| 3,225,573 | 12/1965 | Johnels | 68/198 |

*Primary Examiner*—John McIntosh
*Attorney, Agent, or Firm*—Lackenbach, Lilling & Siegel

[57] ABSTRACT

An apparatus for effecting impregnation of cermet electrodes of an alkaline storage battery, according to the invention, comprises a tank with active solutions which accommodates a member from which electrode stock members are suspended. The stock members are made as a set of forms, each being used for a band stock to be reeled thereon together with a spacer element. The spacer element is adapted to form an appropriate space between the turns of the band stock.

The spacer element is made of individual interconnected frames forming a chain of a specified length and provided with projections on both sides of longitudinal and transverse strips constituting a frame, so as to provide circulation of an active solution between the turns of the band stock.

2 Claims, 4 Drawing Figures

METHOD AND APPARATUS FOR IMPREGNATION OF CERMET ELECTRODES OF AN ALKALINE STORAGE BATTERY

FIELD OF INVENTION

The present invention relates to the manufacture of storage batteries and, more particularly, to a method and an apparatus for the impregnation of cermet electrodes of an alkaline storage battery.

The herein proposed method and apparatus are readily adaptable for application in the production of various nickel-cadmium storage batteries, thereby assuring higher productivity of labor, economy of materials and a more simple impregnation process, particularly in treating exceptionally thin band stock for electrodes of storage batteries having a high specific capacity.

An increase in the specific capacity of alkaline storage batteries provided with cermet electrodes, e.g. batteries used in aviation, electromobiles, etc., is made possible mainly due to the manufacture of especially thin electrodes cut from a sintered band stock after it has been impregnated, formed and cleaned of impurities.

DESCRIPTION OF THE PRIOR ART

There is known in the art a method of impregnation of cermet electrodes cut from a super thin band stock with a thickness of the perforated metal backing on the order of 20 to 50 microns, which suffers from a disadvantage, it being the insufficient strength of such bands. In view of the above, the impregnation is carried out either of separate electrodes or of a short band stock with a length equal to that of 1 to 3 electrodes cut from a sintered band stock prior to its impregnation.

The above method (cf. of the book by M. A. Dasoyan, V. V. Novoderezhkin, F. F. Tomashevsky, entitled "Proizvodstvo elektricheskikh akkumulatorov" (Storage Battery Manufacture), 2-nd edition, "Vyshaya Shola" Publishers, USSR, Moscow, 1970, pp. 384–387, 393–395) consists of assembling the stock members by hand to take the form of cassettes appropriate for the process with a space allowing the solution to freely circulate between the adjacent stock members.

The cassettes with stock members arranged therein are assembled to form suspending members which are successively placed into active solutions in accordance with the process.

The processes are conducted in aggressive media at a temperature of up to 150° C. Upon completion of the impregnation process, the suspending members and cassettes are dismantled the stock members are precleaned, also by hand, to be thereafter delivered for forming as well as for electrochemical and mechanical treatment.

The aforedescribed method of impregnation is labor consuming and inefficient and, it does not allow manual operations to be mechanized, a high waste of materials being its inescapable deficiency resulting from cutting the electrodes from standard stock members.

The French company "Saft", known to be a leading manufacturer of storage batteries provided with smeared sintered electrodes, employs a method of band stock impregnation, wherein the sintered band stock is reeled with helical mandrels arranged between the turns so as to provide appropriate spaces therebetween to allow circulation of solutions. In this case the helical mandrels provide the space, and support the turns of the band stock at its edges.

An apparatus for carrying out the above method comprises tanks for active solutions wherein is disposed a suspending member with a band stock reeled on forms and helical mandrels providing for appropriate spaces between the turns when reeling the band stock onto the forms.

The above-described method of and apparatus for impregnation of the band stock are disadvantageous in that both the method and apparatus do not allow an exceptionally thin band stock to be impregnated, since the edges of the with a metal backing of 20 to 50 microns have a low strength and, therefore, are incapable of keeping the band stock in the helical mandrels, thus failing to assure a uniform space between the turns of the band stock over its entire width. Furthermore, the insertion of the band edges into the helical mandrels, when reeling the bands, requires special guide means designed to operate under sufficient rigidity of the band stock, the insertion operation being performed at a low speed of the band and under the continuous observation of service personnel, thereby requiring the use of manual labor.

The reeling of super fine bands of low strength by this method will, consequently, require still larger amounts of manual labor, which is economically inexpedient.

SUMMARY OF THE INVENTION

It is, therefore, an object of the present invention to eliminate the above-mentioned disadvantages.

Another object of the invention is to provide a method of and an apparatus for impregnation of cermet electrodes of an alkali storage battery, which assures the impregnation of exceptionally thin electrodes.

These objects are accomplished by a method of impregnation of cermet blanks for electrodes used in an alkaline storage battery provided with a sintered band stock reeled so as to ensure an appropriate space between the turns and then placed into active solutions, in which, according to the invention, the band stock is reeled together with a spacer element arranged throughout the entire length and width of the band stock so as to provide an appropriate space between the turns of the band stock.

The spacer element is preferably made of tetrafluoroethylene with ethylene, e.g. by pressure casting, in order to provide high stability of the element in an aggressive medium at temperatures of up to 200° C.

These objects of the invention are likewise attained in an apparatus for effecting impregnation of cermet electrodes of an alkaline storage battery, comprising a tank with active solutions, which accommodates a member from which stock members made as a set of forms, are suspended. Each form is used for a band stock to be reeled thereon so as to provide an appropriate space between the turns by means of a spacer element. According to the invention, the spacer element is made of individual interconnected frames constituting a continuous chain and provided with projections on both sides of longitudinal and transverse strips forming the frame so as to provide circulation of the active solution between the turns of the band stock.

The method of impregnation of cermet electrodes of an alkaline storage battery and the apparatus for carrying this method into effect, according to the present invention, enhance the productivity of labor and facilitate the process of impregnation of exceptionally thin electrodes of high-capacity storage batteries owing to the arrangement of the spacer element throughout the entire length and width of the band stock, which enables the impregnation and cleaning of exceptionally thin electrodes made of a band stock having a small thickness and low strength at its edges. The process of reeling the bands can be mechanized, thereby reducing labor consumption in the process of impregnation by 5 to 8 times, as compared to the manual assembly of the stock members in cassettes required for the technological process.

The possibility of reeling the band stock together with the spacer element at a speed higher than that in the aforedescribed case, wherein the reeling is effected by arranging the turns in helical mandrels which support the turns of the band stock at its edges, renders the proposed apparatus economically profitable as well when used for impregnation of rather thick and strong band stock.

The fact that the spacer element is made of separate interconnected frames forming a continuous chain, allows the frames of chemically and thermally stable materials, preferably fluorine-containing materials, to be produced by pressure casting, thus assuring long service life of the spacer element. The possibility of replacing any faulty frame in the chain of the spacer element reduces the maintenance cost of the apparatus according to the present invention.

BRIEF DESCRIPTION OF THE INVENTION

Other objects and advantages of the present invention will be apparent from the following detailed description of embodiments thereof with reference to the accompanying drawings. In the drawings.

DETAILED DESCRIPTION OF THE INVENTION

A method of impregnation of cermet electrodes of an alkaline storage battery, according to the present invention, consists of reeling a cermet band stock for electrodes together with a spacer element extending through the whole length and width of the band stock so as to provide a uniform space between the turns of the band stock regardless of its thickness and strength, thus providing circulation of solutions between the turns. The reeled band stock is then impregnated as it is successively placed into tanks containing different active solutions and into chambers with a controlled medium. On completion of the impregnation process, the band stock and the spacer element are unreeled, undergoing at the same time washing, mechanical treatment and drying operations.

The band stock is then directed for further treatment, according to the technological process, while the spacer element is reused.

The spacer element is preferably made of a copolymer of tetrafluoroethylene with ethylene, e.g. by means of pressure casting, which enhances durability of the spacer element designed for continuous operation in highly aggressive solutions and at a high temperature in the chambers with a controlled medium.

The use of a spacer element, arranged throughout the entire width of the band stock with which it is formed into a reel, makes it possible to impregnate cermet electrodes made of a band stock having a small thickness and strength, which enhances the productivity of labor and facilitates the process of reeling the reeling operation lending itself readily to mechanization.

The use of a separator element made of fluorine, containing materials having high chemical, thermal and mechanical resistance, cuts the manufacturing costs.

The proposed method of impregnation of cermet electrodes of an alkaline storage battery makes it possible to mechanize auxiliary operations and can be effected with the aid of an apparatus described below.

Figure 1:
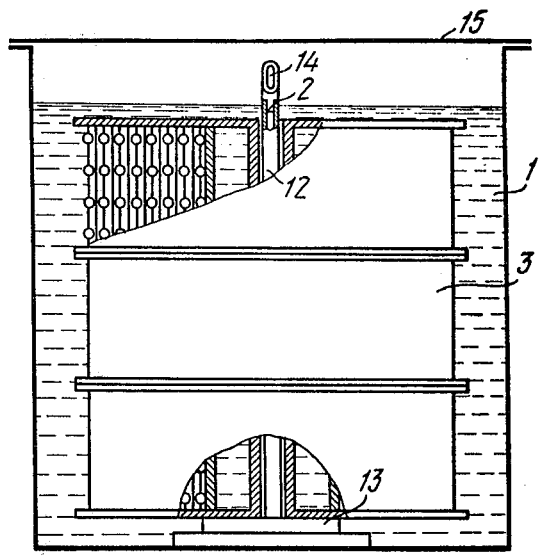
FIG. 1 is an elevational, party in section, view of an apparatus for impregnation of cermet electrodes of an alkaline storage battery (an embodiment provided with a single tank is shown)
Figure 2:
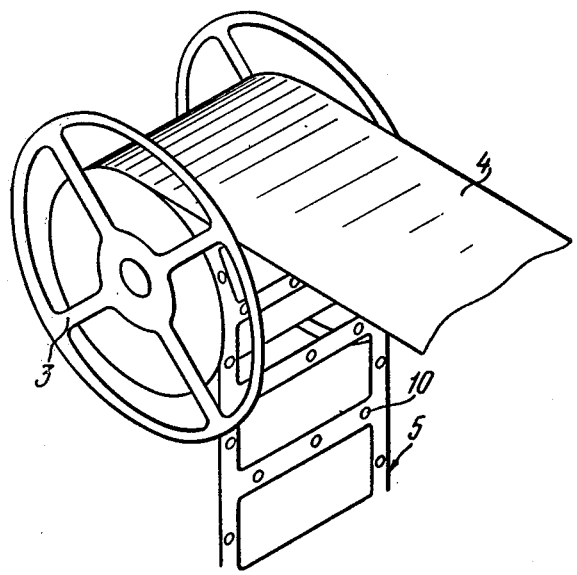
FIG. 2 is a perspective view of a form with a band stock and a spacer element in the process of reeling.
Figure 4:
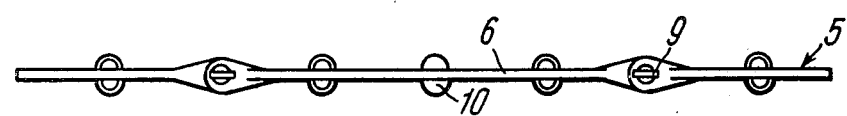
FIG. 4 is an end view of a spacer element.
Figure 3:
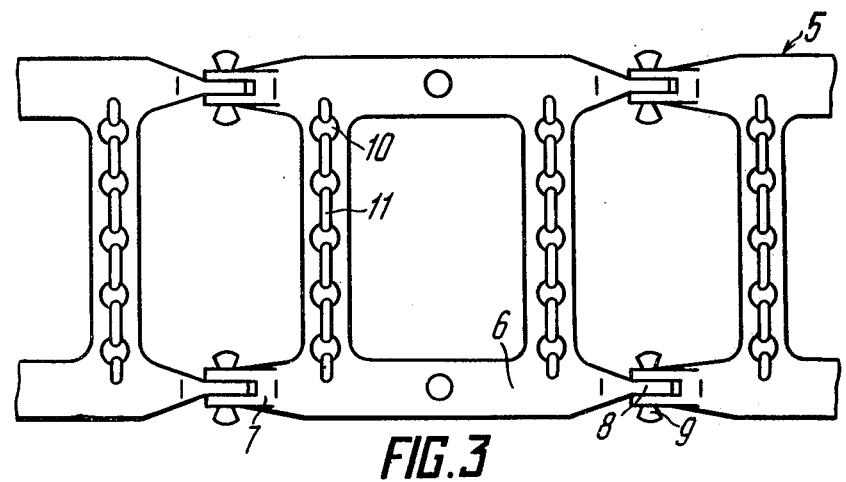
FIG. 3 is a top plan view of a spacer element.

According to the present invention, an apparatus for impregnation of cermet electrodes of an alkaline storage battery comprises a plurality of tanks 1 (FIG. 1 shows one tank, the others being of the same design) filled with different active solutions, in to which, according to the technological process, a suspension member 2 with the band stock to be treated is placed. (The apparatus may be provided with a single tank, in which active solutions are alternately replaced, while the suspension member remains in fixed position throughout the treating cycle). The suspension member 2 comprises a set of forms 3 (FIGS. 1, 2) carrying a band stock 4 (FIG. 2) reeled thereon together with a spacer element 5. The spacer element 5 (FIGS. 2, 3, 4) consists of frames 6 formed with eyes 7 (FIG. 3) at one end and with eyes 8 at the other end. By bringing the eyes 7 and 8 of adjacent frames 6 into coincidence with each other and connecting them by a rod 9, hinge joints are thereby formed to constitute a chain of frames 6. Projections 10 (preferably spherical) are made on the surface of longitudinal and transverse strips of each frame 6 to provide an appropriate space between the turns of the band stock 4 (FIG. 2), thereby enabling free circulation of solutions between the adjacent turns of the band stock 4.

In this case, the total height of two coaxial projections 10 (FIG. 4) should not differ from the height (in cross section) of the hinge joint of the eyes 7 and 8 of the adjacent frames 6.

The adjacent projections 10 on the transverse strips of the frames 6 are preferably interconnected by ribs 11 to prevent bending of the band during tensioned reeling thereof.

The suspension member 2 (FIG. 1) consists of a rod 12 on which the forms 3 are fitted. The rod 12 is restricted at one end by a supporting disk 13, and has at the other end thereof an eye 14 for engaging a hook of a hoisting mechanism (not shown) to allow transportation of the suspension member 2.

The tank 1 is provided with a cover 15 and has branch pipes which are connected to a ventilation system and to means (not shown) for heating, and which are also used for filling and discharging solutions from the tank 1.

The apparatus according to the present invention operates as follows.

Prior to being impregnated, the band stock 4 (FIG. 2) together with the spacer element 5 is reeled onto the form 3 (for example, by means of a three-shaft mechanism having at least one of its shafts connected to a drive, the other two shafts being provided with a braking device), the ends of the band stock 4 and the spacer element 5 then being fixed together, e.g. by binding them with a cord.

The reeled forms 3 are thus fitted on the rod 12 (FIG. 1), the assembled suspension member 2 to be thereafter placed into the tank 1 filled with an active solution.

The impregnation is carried out according to a specified technological process by successively placing the suspension member 2 into different active solutions and keeping it therein for predetermined time intervals.

After impregnation, washing and drying operations, the suspension member 2 is dismantled, the band is unreeled from the forms 3 to undergo mechanical and electrochemical treatment, as well as forming, according to the specified technological process.

The apparatus according to the present invention makes it possible to carry out the method of impregnation of cermet electrodes of an alkaline storage battery, made of a band stock 4, having a small thickness and strength, owing to the fact that the spacer element 5 is made of individual frames 6 which can be manufactured from fluorine-containing materials by means of high-performance pressure-casting equipment.

The fact that the spacer element 5 is made in the form of interconnected frames 6 connected together by hinges, forming a chain of a specified length, makes it possible to mechanize the operation of reeling the band stock 4 and the spacer element 5, thereby ensuring high operating efficiency.

With the spacer element 5 of the frames 6 being formed by thin longitudinal and transverse strips having projections 10 on both sides, a uniform space is thereby assured between the adjacent turns of the band stock 4 regardless of its width and strength, which, at the same time, permits circulation of active solutions between the turns of the band stock 4.

What is claimed is:

1. An apparatus for effecting impregnation of cermet electrodes of an alkaline storage battery, comprising: a tank with active solutions; a suspension member, for electrode stock members, including a set of forms, each form being used for reeling thereon a band stock, said suspension member being disposed in said tank; a spacer element reeled together with said band stock on each of said forms to provide an appropriate space between turns of the band stock, said spacer element being made of individual interconnected frames hinged together to form a chain of a specified length and being provided with projections on both sides of longitudinal and transverse strips forming said frame to ensure circulation of the active solution between the turns of the band stock.

2. An apparatus according to claim 1, wherein the suspension member includes a rod on which the forms are fitted, said rod having an eye on one end for engagement with a hoisting means; and further comprising a supporting disc secured to a bottom portion of said tank and being secured to the other end of said rod for holding it rigidly in place.

* * * * *

UNITED STATES PATENT OFFICE
CERTIFICATE OF CORRECTION

PATENT NO. : 4,171,679
DATED : October 23, 1979
INVENTOR(S) : Ivan Alexandrovich Kolosov, et al It is certified that error appears in the above-identified patent and that said Letters Patent are hereby corrected as shown below:

Change the title in the line identified by [54] on page 1 of the patent to read --APPARATUS FOR IMPREGNATION OF CERMET ELECTRODES OF AN ALKALINE STORAGE BATTERY--.

Also, change the title in column 1 of the patent to read --APPARATUS FOR IMPREGNATION OF CERMET ELECTRODES OF AN ALKALINE STORAGE BATTERY--.

Signed and Sealed this

Twenty-second Day of January 1980

[SEAL]

Attest:

SIDNEY A. DIAMOND

Attesting Officer

Commissioner of Patents and Trademarks